United States Patent
Snyder

(10) Patent No.: US 7,152,056 B2
(45) Date of Patent: Dec. 19, 2006

(54) APPARATUS AND METHOD FOR GENERATING DATA USEFUL IN INDEXING AND SEARCHING

(75) Inventor: James D. Snyder, Hopewell, NJ (US)

(73) Assignee: Dow Jones Reuters Business Interactive, LLC, Princeton, NJ (US)

( * ) Notice: Subject to any disclaimer, the term of this patent is extended or adjusted under 35 U.S.C. 154(b) by 462 days.

(21) Appl. No.: 10/417,548

(22) Filed: Apr. 16, 2003

(65) Prior Publication Data

US 2003/0200199 A1    Oct. 23, 2003

Related U.S. Application Data

(60) Provisional application No. 60/374,003, filed on Apr. 19, 2002.

(51) Int. Cl.
*G06F 17/30*    (2006.01)
(52) U.S. Cl. .............................. 707/2; 707/6
(58) Field of Classification Search ................ 707/1–6, 707/100; 715/500, 531
See application file for complete search history.

(56) References Cited

U.S. PATENT DOCUMENTS

| | | | |
|---|---|---|---|
| 5,835,667 A | 11/1998 | Wactlar et al. | 386/96 |
| 6,092,064 A | 7/2000 | Aggarwal et al. | 707/6 |
| 6,243,713 B1 | 6/2001 | Nelson et al. | 707/104.1 |
| 6,654,717 B1 * | 11/2003 | Loofbourrow et al. | 704/9 |
| 6,735,583 B1 | 5/2004 | Bjarnestam et al. | 707/2 |
| 6,804,662 B1 * | 10/2004 | Annau et al. | 707/2 |
| 6,823,492 B1 * | 11/2004 | Ambroziak | 715/530 |

FOREIGN PATENT DOCUMENTS

WO    WO 0150352    7/2001

OTHER PUBLICATIONS

Personal Library Software, Inc., CPL 6.2 Programmer's Guide, 1996, pp. 177-186.

* cited by examiner

*Primary Examiner*—Greta Robinson
*Assistant Examiner*—Cheryl Lewis
(74) *Attorney, Agent, or Firm*—Dorsey & Whitney LLP

(57) ABSTRACT

Processing of source documents to generate data for indexing, and of queries to generate data for searching, is done in accordance with retrieved tokenization rules and, if desired, retrieved normalization rules. Tokenization rules are used to define exactly what characters (letters, numbers, punctuation characters, etc.) and exactly what patterns of those characters (one or more contiguous characters, every individual character, etc.) comprise indexable and searchable units of data. Normalization rules are used to (potentially) modify the tokens created by the tokenizer in indexing and/or searching operations. Normalization accounts for things such as case-insensitive searching and language-specific nuances in which document authors can use accepted variations in the spelling of words. Query processing must employ the same tokenization and normalization rules as source processing in order for queries to accurately search the databases, and must also employ another set of concordable characters for use in the query language. This set of "reserved" characters includes characters for wildcard searching, quoted strings, field-qualified searching, range searching, and so forth.

17 Claims, 2 Drawing Sheets

APPARATUS AND METHOD FOR GENERATING DATA USEFUL IN INDEXING AND SEARCHING

CROSS-REFERENCE TO RELATED APPLICATIONS

This application claims the benefit of and priority to U.S. Provisional Patent Application Ser. No. 60/374,003, filed Apr. 19, 2002, the disclosure of which is hereby incorporated by reference in its entirety.

BACKGROUND OF THE INVENTION

1. Field of the Invention

The present invention relates to data base technology, and more particularly to apparatus and methods for generating data useful in indexing and searching.

2. Description of the Related Art

A variety of systems exist for indexing and searching data. One system previously offered for use by Dow Jones & Company, Inc., New York, N.Y., was known as the Callable Personal Librarian ("CPL"). Utilizing software from a company previously known as Personal Library Software ("PLS"), the system integrated indexing, searching, and rules-based definition of tokenization patterns into a single coded system. The definitions were part of the code of the CPL system and not accessible or changeable outside of the CPL code. The CPL system also did not normalize data. The current PLS software is now available as shareware from America Online, Inc., a division of AOL Time Warner Inc. of New York, N.Y., through their Web site at http://www-.pls.com/.

Another system previously offered for use by Reuters Group PLC of London, England was based on standard white-space-based tokenization and did not provide for normalization of data.

BRIEF SUMMARY OF THE INVENTION

Although the Dow Jones CPL system successfully employed rules-based definition of tokenization patterns and was in widespread use, it was an inflexible system from the system operator's perspective because the definitions were part of the code of the CPL system and not accessible or changeable outside of the CPL code. The flexibility and usability of systems using rules-based definition of tokenization patterns is dramatically improved by separating the system into different subsystems, including a subsystem for source processing (generation of data for indexing) and another subsystem for query processing (generation of data for searching). The source processing subsystem and the query processing subsystems do not contain tokenization rules; rather, they retrieve tokenization rules from the same store of pattern definitions and concordable character definitions. The store may also contain normalization rules. The store, which is separate from the source processing and query processing subsystems, may be implemented in any desired manner, including the use of any of a variety of well known techniques.

One embodiment of the invention is a method for computerized processing of document data, comprising receiving the document data; retrieving tokenization rules for the document data; and applying the tokenization rules to the document data to generate a plurality of tokens. Each of the tokens has one or more concordable characters from the document data.

Another embodiment of the invention is a method for query processing comprising: receiving a user query; retrieving tokenization rules; applying the tokenization rules to the user query to generate one or more search tokens, each having one or more concordable characters from the user query; and searching an index with the one or more search tokens, the index comprising tokens based on application of the tokenization rules to document data.

Another embodiment of the invention is a method for computerized searching of document data, comprising receiving the document data; retrieving tokenization rules for the document data; applying the tokenization rules to the document data to generate a plurality of tokens, each having one or more concordable characters from the document data; storing the tokens in a data base; receiving a user query derived from a query language and comprising at least one reserved character from a set of concordable characters for use in the query language; re-retrieving the tokenization rules; applying the re-retrieved tokenization rules to the user query to generate one or more search tokens, each having one or more concordable characters from the user query; and searching the tokens in the data base with the one or more search tokens.

Another embodiment of the invention is an apparatus comprising a subsystem for computerized processing of source documents, the source processing subsystem comprising a programmed component for receiving the document data; a programmed component for retrieving tokenization rules for the document data; and a programmed component for applying the tokenization rules to the document data to generate a plurality of tokens. Each of the tokens has one or more concordable characters from the document data.

Another embodiment of the invention is an apparatus comprising a subsystem for computerized processing of search queries, the query processing subsystem comprising a programmed component for receiving a user query; a programmed component for retrieving tokenization rules; a programmed component for applying the tokenization rules to the user query to generate one or more search tokens, each having one or more concordable characters from the user query; and a programmed component for searching an index with the one or more search tokens, the index comprising tokens based on application of the tokenization rules to document data.

Another embodiment of the invention is an apparatus for computerized searching of document data comprising a source processing subsystem and a query processing subsystem. The source processing subsystem comprises a programmed component for receiving the document data; a programmed component for retrieving tokenization rules for the document data; a programmed component for applying the tokenization rules to the document data to generate a plurality of tokens for storage in a data base, each of the tokens having one or more concordable characters from the document data. The query processing subsystem comprises a programmed component for receiving a user query derived from a query language and comprising at least one reserved character from a set of concordable characters for use in the query language; a programmed component for re-retrieving the tokenization rules; a programmed component for applying the re-retrieved tokenization rules to the user query to generate one or more search tokens for searching the tokens in the data base, each of the search tokens having one or more concordable characters from the user query.

Another embodiment of the invention is a computer-readable medium carrying a subsystem program for computerized processing of source documents, the subsystem program comprising instructions for receiving the document data; instructions for retrieving tokenization rules for the document data; and instructions for applying the tokenization rules to the document data to generate a plurality of tokens, each having one or more concordable characters from the document data.

Another embodiment of the invention is a computer-readable medium carrying a subsystem program for computerized processing of search queries, the subsystem program comprising instructions for receiving a user query; instructions for retrieving tokenization rules; instructions for applying the tokenization rules to the user query to generate one or more search tokens, each having one or more concordable characters from the user query; and instructions for searching an index with the one or more search tokens, the index comprising tokens based on application of the tokenization rules to document data.

Another embodiment of the invention is a computer-readable medium carrying a subsystem program for computerized processing of source documents and a subsystem program for computerized processing of search queries. The source processing subsystem program comprises instructions for receiving the document data; instructions for retrieving tokenization rules for the document data; and instructions for applying the tokenization rules to the document data to generate a plurality of tokens for storage in a data base, each of the tokens having one or more concordable characters from the document data. The query processing subsystem program comprises instructions for receiving a user query derived from a query language and comprising at least one reserved character from a set of concordable characters for use in the query language; instructions for re-retrieving the tokenization rules; and instructions for applying the re-retrieved tokenization rules to the user query to generate one or more search tokens for searching the tokens in the data base, each of the search tokens having one or more concordable characters from the user query.

DETAILED DESCRIPTION OF THE INVENTION, INCLUDING THE BEST MODE

Processing of source documents to generate data for indexing, and of queries to generate data for searching, is done in accordance with retrieved tokenization rules and, if desired, retrieved normalization rules. Tokenization rules are used to define exactly what characters (letters, numbers, punctuation characters, etc.) and exactly what patterns of those characters (one or more contiguous characters, every individual character, etc.) comprise indexable and searchable units of data. Normalization rules are used to (potentially) modify the tokens created by the tokenizer in indexing and/or searching operations. Normalization accounts for things such as case-insensitive searching and language-specific nuances in which document authors can use accepted variations in the spelling of words. Query processing must employ the same tokenization and normalization rules as source processing in order for queries to accurately search the databases, and must also employ another set of concordable characters for use in the query language. This set of "reserved" characters includes characters for wildcard searching, quoted strings, field-qualified searching, range searching, and so forth.

Tokenization Rules

Tokenization rules are used to define exactly what characters (letters, numbers, punctuation characters, etc.) and exactly what patterns of those characters (one or more contiguous characters, every individual character, etc.) comprise indexable and searchable units of data. These indexable and searchable units of data are referred to as tokens. A token is made up of one or more concordable characters.

Tokenization rules are used primarily for system integrity purposes. By defining rules that allow certain character patterns to be treated as an entity, the integrity of the system is increased by minimizing (or eliminating) "false hits". The rules unambiguously define exactly what characters and character patterns define a token.

Figure 1:
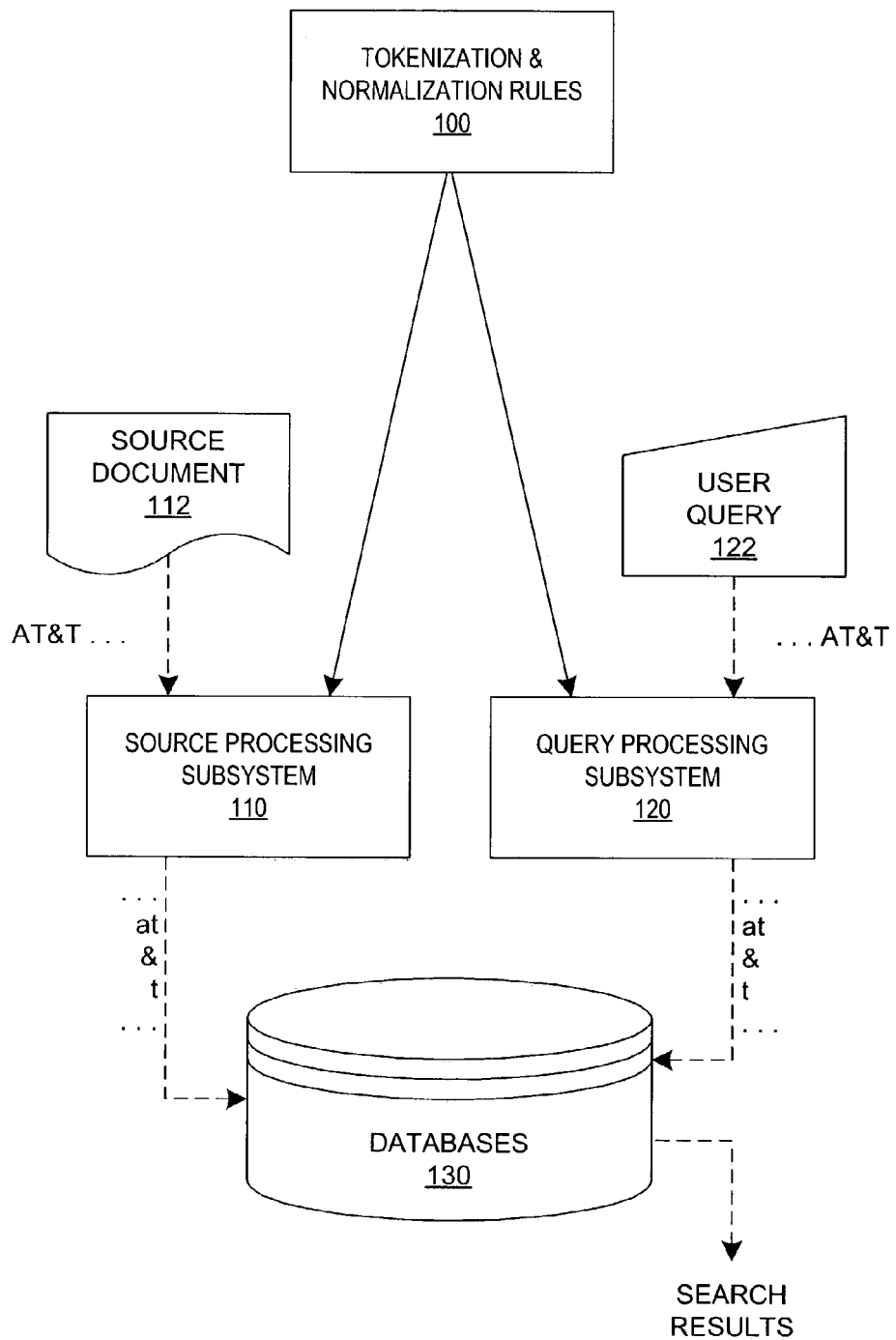
FIG. 1 is a schematic diagram of an illustrative system using rules-based definition of tokenization patterns and normalization, in accordance with one aspect of the present invention.

As shown in FIG. 1, tokenization rules 100 apply to both source processing and query processing. The same rules must be employed in each subsystem, i.e. the source processing subsystem 110 which processes source document 112, and the query processing subsystem 120 which processes user query 122, for queries to be accurate. For example, suppose an input document contains the sentence:

The breakup of AT&T resulted in an increased number of long distance carriers.

and source processing tokenizes "AT&T" as a three adjacent tokens "at", "&", and "t" (case-insensitive). If a user query then contains:

at&t or sprint or mci then query processing must tokenize the "at&t" part of the query string the same as source processing in order for the query to accurately search the database 130.

Figure 2:
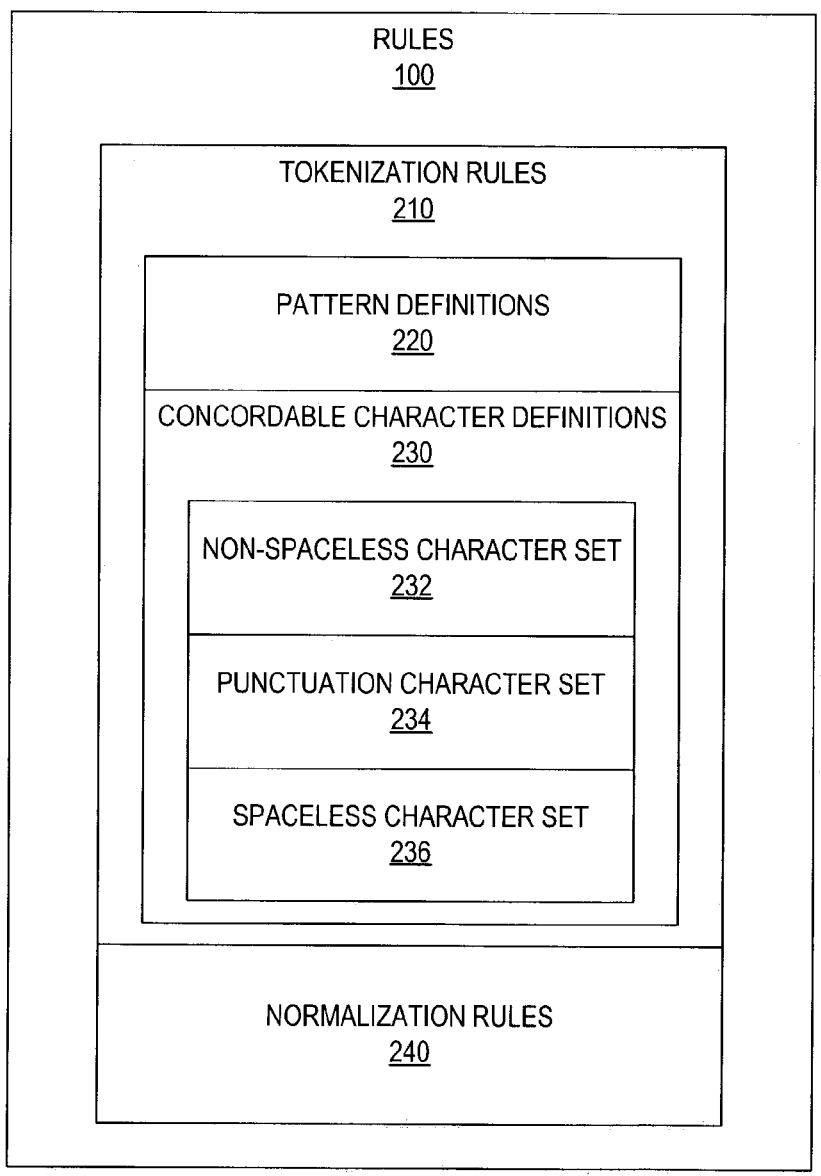
FIG. 2 is a block schematic diagram showing an organization of tokenization rules and normalization rules useful in the system of FIG. 1, in accordance with one aspect of the present invention.

As shown in the illustrative example of FIG. 2, the concordable characters 230 used in the tokenization rules 210 can be viewed as comprising distinct sets. Three such distinct sets are shown in FIG. 2. The first distinct set is a non-spaceless character set 232. This set 232 includes letters and numbers used in languages in which words are made up of one or more characters (like English, French, Spanish, and so on). The second distinct set 234 is a punctuation character set. This set 234 includes the punctuation characters that occur in textual data constructs that are considered to have search value when used in conjunction with the non-spaceless characters. This set 234 includes the ampersand (&), plus sign (+), and at sign (@). The tokenization rules 210 are defined such that every occurrence of each these punctuation characters is a token; however, the search value of these characters is properly realized when they are used in conjunction with the non-spaceless characters. The third distinct set 236 is a spaceless character set. This set 236 includes characters (primarily used in Asian languages) in which every concordable character is considered to be a token.

Illustrative concordable characters in each of these illustrative character sets 232, 234 and 236 are listed below in Tables 1, 2 and 3 respectively. The glyphs that correspond to the hex values can be viewed in a Unicode book or on the Web at URL www.unicode.org.

TABLE 1

Non-Spaceless Character Set

| Unicode Hex Range | Description |
| --- | --- |
| 0030–0039 | Basic Latin numbers |
| 0041–005A | Basic Latin letters |
| 0061–007A | |
| 00C0–00D6 | Latin-1 Supplement letters |
| 00D8–00F6 | |
| 00F8–00FF | |
| 0100–017E | Latin Extended-A letters |
| 0191–0192 | Latin Extended-B f hook upper and lower |
| 01CD–01DC | Pinyin diacritic-vowel combinations |
| 0391–03A1 | Greek letters |
| 03A3–03A9 | |
| 03B1–03C9 | |
| 0401–040C | Cyrillic letters |
| 040E–044F | |
| 0451–045C | |
| 045E–045F | |
| FF10–FF19 | Fullwidth Latin numbers |
| FF21–FF3A | Fullwidth Latin letters |
| FF41–FF5A | |

TABLE 2

Punctuation Character Set

| Unicode Hex Value | Description |
| --- | --- |
| 0026 | Basic Latin Ampersand |
| 002B | Basic Latin Plus Sign |
| 0040 | Basic Latin At Sign |
| FF06 | Fullwidth Latin Ampersand |
| FF0B | Fullwidth Latin Plus Sign |
| FF20 | Fullwidth Latin At Sign |

TABLE 3

Spaceless Character Set

| Unicode Hex Range | Description |
| --- | --- |
| 3005 | CJK Ideographic iteration mark |
| 3041–3094 | Hiragana letters |
| 3099–309A | Combining Katakana-Hiragana sound marks |
| 30A1–30FA | Katakana letters |
| 30FC | Katakana-Hiragana prolonged sound mark |
| 4E00–9FA5 | CJK Unified Ideographs |
| F900–FA2D | CJK Compatibility Ideographs |
| FF66–FF9D | Halfwidth Katakana letters |

Illustrative pattern definitions are detailed below in Table 4.

TABLE 4

Pattern Definitions

| Rule | Examples/Intended Textual Data Pattern |
| --- | --- |
| One or more contiguous concordable characters from the non-spaceless character set (as detailed in Table 1). Each individual occurrence of an ampersand [&], an at sign [@], or a plus sign [+]. | clinton<br>123<br>mañana<br>at&t<br>@home<br>a+<br>c++ |
| Each individual concordable character from the spaceless character set (as detailed in Table 3). | Japanese<br>Chinese |

The tokenization rules 210 do not define traditional term separators such as blank spaces, commas, semi-colons, and so on. Rather, the rules work by defining what makes up a token, so term separation can occur with or without the occurrence of traditional term separators. The following example shows how the illustrative tokenization rules 210 apply to text in generating tokens; note the characters that are concorded (that is, kept) and the characters that are not concorded (that is, thrown away) because of the rules. In the following sentence:

S&P today affirmed A+/A−1 ratings on China Light & Power.

the tokens (in order, as lowercase adjacent terms, with reasons) would be as follows:

| | |
| --- | --- |
| s | [non-spaceless character] |
| & | [single ampersand] |
| p | [non-spaceless character] |
| today | [contiguous non-spaceless characters] |
| affirmed | [contiguous non-spaceless characters] |
| a | [non-spaceless character] |
| + | [single plus sign] |
| a | [the front slash in "A+/A−1" is not concorded] |
| 1 | [the hyphen in "A+/A−1" is not concorded] |
| ratings | [contiguous non-spaceless characters] |
| on | [contiguous non-spaceless characters] |
| china | [contiguous non-spaceless characters] |
| light | [contiguous non-spaceless characters] |
| & | [single ampersand] |
| power | [contiguous non-spaceless characters; note trailing period is not concorded] |

These exemplary rules are specifically defined for a particular system, and other rules may be defined for other systems. They are designed to address specific patterns in textual data. For example, the tokenization of the at sign [@] is designed to make a term like "@home" searchable. These rules may be subject to modification over time to account for new conventions in textual data. It is assumed that in general, such rules would only be applied on a forward basis (that is, old documents need not be reprocessed to introduce new tokenization rules) because reprocessing old content is extremely expensive; however, such reprocessing could be done if the business deems it necessary.

Note also that the tokenization of the punctuation characters makes each of these characters individually searchable in the system (not just when used in conjunction with non-spaceless characters). For example, a user may enter a query of just "&" and get hits (in fact, many hits). Some may view this as desirable system behavior while others may not.

Normalization Rules

Normalization rules 240 are used to (potentially) modify the tokens created by the tokenizer in indexing and/or searching operations. Normalization accounts for things such as case-insensitive searching and language-specific nuances in which document authors can use accepted variations in the spelling of words. Normalization includes items like in the following examples.

As a first example, in indexing and searching operations, all terms are normalized to lower case. For example, document terms or query terms entered as "cat", "Cat", "cAt", "caT", "CAt", "cAT", "CaT", or "CAT" are each indexed or searched as "cat". This allows any case form of the query term to hit any case form of the document term.

As a second example, certain characters are converted to one or more other characters in indexing and searching. An example of this would be the Latin small letter sharp s (β), which would be normalized to "ss" for indexing and searching operations. This would allow documents written by an author using either "β" or "ss" to be found by queries using either "β" or "ss".

As a third example, in indexing only, terms containing certain extended Latin characters are double-indexed—once with the term containing its raw character(s), and once with a "flattened" version of the term in which all such characters have been converted to their Basic Latin equivalents. No such normalization is done on the search side; this allows users with keyboards that can generate these extended Latin characters to search using these characters, but users who do not have such keyboards can search using the flattened versions of the characters.

Various forms of normalization may be done in an actual system. Some may be done only on the index side, while others may be done on both the index and query sides. An illustrative set of exemplary normalization rules 240 is listed below in Table 5.

TABLE 5

Normalization Rules

| | |
|---|---|
| Rule 1 | In indexing and in searching, all uppercase characters are converted to lowercase (for case-insensitive searching). |
| Rule 2 | In indexing and searching, any occurrence of any of the following characters are replaced with the specified characters: <br> a with diaeresis (ä) is replaced with "ae". <br> o with diaeresis (ö) is replaced with "oe". <br> u with diaeresis (ü) is replaced with "ue". <br> small sharp s (β) is replaced with "ss". |
| Rule 3 | In indexing and searching, Fullwidth Latin characters are converted to their Basic Latin equivalents. |
| Rule 4 | In indexing and searching, Halfwidth Katakana characters are converted to their normal Katakana equivalents. |
| Rule 5 | In indexing only, any token containing any of the following characters are double-indexed -- once in raw form, and once in a normalized form in which all occurrences of these characters are converted to their 7-bit Basic Latin equivalent: <br> Latin-1 Supplement letters not in Rule 2 (for example, a with ring (å)). <br> Latin Extended-A letters (for example, c with dot above). <br> Pinyin diacritic-vowel combinations (for example, a with caron). <br> For searching, no normalization of these characters need occur (other than lowercasing) -- the query term is used as entered by the user. |

Note the following three points about this normalization of data.

First, to support case-sensitive searching, any document term whose raw form is not all lower case would be double-indexed—once in raw form and once in all lower case. For example, a term that appears as "Cat" in a document would be indexed twice—once as "Cat" and once as "cat". This has the effect of dramatically increasing the size of the index, perhaps by as much as 20%, due to beginning-of-sentences, proper names, acronyms, and so on.

Second, the normalization of data for indexing and searching does not affect the look of the data for display. For example, if an input document contains a word containing "β", then the document is indexed as if it contained "ss", and any query that a user types containing a "β" is modified to contain "ss" so that it hits on the document properly, but when the document is displayed, it is displayed with the "β".

Third, double-indexing terms containing certain extended Latin characters can lead to larger, less-accurate hit lists for certain query terms and content sets. For example, suppose one document contains the term "paté" and another document contains the term "pate". In the first document, "paté" would be double-indexed—once as "paté" and once as "pate". In the second document, the term "pate" would be indexed only once—as "pate". A user query of "paté" would hit only the first document, but a user query of "pate" would hit both documents. So, if the user is really searching for the term "pate" (meaning part of a head), then the user get hits on documents containing "paté" (a food product) in addition to "real" hits on documents that actually contain "pate".

As with the tokenization rules 210, the normalization rules 240 must be applied consistently in both source processing and query processing in order for queries to accurately search the databases 130 (FIG. 1).

Query Language Reserved Characters

As stated previously, query processing must employ the same tokenization and normalization rules as source processing in order for queries to accurately search the databases 130 (FIG. 1). In addition to the above tokenization rules 210 and normalization rules 240, query processing must employ another set of concordable characters for use in the query language. This set of "reserved" characters includes characters for wildcard searching, quoted strings, field-qualified searching, range searching, and so on.

For example, consider the string:

transfer?

If this string appears as text in an input document, then source processing should tokenize it as "transfer" (and the "?" would be thrown away). However, if this string appears as a query term, then (as is detailed below) query processing must recognize the question mark as a wildcard character and perform the appropriate processing.

An illustrative set of query parsing concordable characters (and their meanings) is listed below in Table 6.

TABLE 6

Query Language Reserved Characters

| Characters | Use |
|---|---|
| $ (Dollar Sign) <br> * (Asterisk) <br> % (Percent Sign) <br> ? (Question Mark) | Various forms of wildcard searching (truncation, single-character matching, single-term matching). |
| = (Equals Sign) | Field-qualified searching. |
| " (Double Quotes) | Tells the query parser not to interpret certain query language keywords (see section on Quotes). |
| + (Plus Sign) <br> − (Minus Sign) <br> / (Front Slash) | Date range searching (only used as part of a date specification). Front slash is also used in several query operators. |
| > (Greater Than Sign) <br> < (Less Than Sign) | Document size range searching. |
| ( (Left Parenthesis) <br> ) (Right Parenthesis) <br> [ (Left Bracket) <br> ] (Right Bracket) | Override default precedence rules. |

Note that there are no ambiguous (conflicting) use of concordable characters in the tokenization rules and query language reserved character sets (other than the plus sign, which can be unambiguously interpreted because its use as a query language reserved character is only valid in a limited date range search syntax). This means that there should be no ambiguity in a system in trying to determine what a given user query is doing if it returns questionable results. This is not coincidental, and is a desired goal in defining the tokenization rules and query language for a system.

The set of query language reserved characters is designed to be as minimal as possible yet still provide all of the functionality needed in the system. This set is subject to expansion in the future to take advantage of new features and capabilities offered in backend technologies. For example, we could introduce a query term suffix reserved character of "#" that would allow the user to request thesaurus expansion of the query term; the thesaurus expansion could account for items like various spellings of words (like "color" and "colour"), synonyms, acronym expansion, and so on.

Raw Query Terms

Raw query terms include standard terms and wildcard characters. These are now explained, along with various examples.

Standard terms are simply the regular query terms that a user enters to execute a search. These terms are processed by the tokenization and normalization rules and are examined for any supported wildcard syntaxes (see below).

Query terms entered by the user as a single term may be broken into multiple raw terms and/or partially discarded by the tokenization rules. For example, if the user entered a query term of:

foreign/domestic then it would be treated as two raw terms "foreign" and "domestic" and the slash character would be discarded because of the tokenization rules. Furthermore, the two terms would then be queried as adjacent terms because adjacency is the default operator.

Illustrative reserved character wildcard syntaxes supported in raw query terms are listed in Table 7 below.

TABLE 7

Reserved Character Wildcard Syntaxes

| | |
|---|---|
| $[N] | (Dollar sign optionally followed by a number) Limited truncation of a stemmed query term. The value of N indicates that the query should match from 0–N characters after the specified stem. Valid values for N are 1–9. If N is omitted, a value of 9 is assumed. A minimum stem of 2 characters is required (that is, at least 2 non-wildcard characters in a query term must be entered before this wildcard character). This wildcard syntax can only appear at the end of a stemmed term. |
| * | (Asterisk) Unlimited truncation of a stemmed query term. A minimum stem of 2 characters is required. This wildcard syntax can only appear at the end of a stemmed term. |
| ? | (Question mark) Match of a single wildcard character (that is, exactly one character) in the position specified in a stemmed query term. There is a minimum stem of 1 character for using this wildcard character. |
| % | (Percent sign) This form of wildcard is designed for use in phrase searching in which the search requires that exactly one term (any term) must appear in proximity to other specified query terms. For example, a query of: president % clinton |

TABLE 7-continued

Reserved Character Wildcard Syntaxes

| | |
|---|---|
| | would match documents containing any of the following text: president bill clinton president william clinton president-elect clinton but would not match documents containing any of the following text: president clinton president william jefferson clinton This syntax is especially valuable in searching in spaceless alphabets, since spaceless alphabet searching (in which every character is a token) cannot use the other wildcard constructs (because of the minimum stem requirements of the other wildcard constructs). This wildcard syntax can only be used in certain query constructs (as an inner term in phrase searching); more information on this syntax and its usage is presented in the "Query Language Caveats" section of this document. |

Examples of legal raw query terms include the following: clinton; at&t (treated as one term because of tokenization rules); cons$ (matches constrain, constitution, but not constitutionally); cons$5 (matches constrain, but not constitution or constitutionally); cons* (matches constrain, constitution, or constitutionally); wom?n (matches woman or women); comp?s? (matches compose or compass, but not comprise).

Examples of illegal raw query terms include the following: c$5 (one character stem is illegal for $ truncation); a* (one character stem is illegal for * truncation); clin$on ($ truncation must appear at the end of a query term); clin*on (* truncation must appear at the end of a query term); ?ill (? wildcard character requires a one-character stem).

Non-Field-Qualified Searching

A query term or expression that is not field-qualified searches only the "text" of the document. This includes the fields listed below. This differs from some systems in which a query term that is not field-qualified searches the entire article (text fields, code fields, etc.). Illustratively, a non-field-qualified search searches the following fields, in this order: Source Name, Section Name, Column Name, Headline, Corrections, Lead Paragraph, Tail Paragraphs, Byline, Credit, Contact, Notes, and Art.

Field-Qualified Searching

An illustrative syntax for field-qualified searching is:

field=term

For example:

hd=clinton finds articles in which clinton appears in the headline.

No characters or whitespace can appear between the field specification and the equals sign in the syntax.

The field=term field qualifiers can be grouped into categories, if desired. Examples of three useful categories are Raw fields, Umbrella fields, and Symbology-Validated fields. These illustrative categories, and their exemplary fields, are described further below.

Note that it is expected that many users will not know or care about the query syntax for many of these fields, because much of the syntax is generated by the user interface. However, there will be users who will want to know and use many of these field qualifiers as part of their search stings because they can type the field-qualified terms faster than using a mouse and dropdown menus.

Note also that many of the supported fields are not intended for use by customers. These fields should not be advertised to customers, nor should there be any mechanism in the web user interface for customers to generate queries involving these fields. The command-line syntax is supported to allow vendor personnel to have access to these fields for necessary internal integrity issues. However, there need be no mechanism for preventing customers from using these field qualifiers in a query string if they become aware of the syntax through some third-party means.

If desired, a template may be used to define how normalized document content is stored. This document definition may be in any suitable format, including XML. There need not be a 1-1 mapping between searchable fields in the XML document definition and the field=term syntax defined in this document. For example, the query syntax in this document defines support for a ric=term syntax for searching RIC codes, but there is no ric field in the XML specification. Also, for example, there is a searchable art field in the XML specification, but the query syntax does not support an art=term construct for searching only the art field (the art field is only searchable as part of a non-field-qualified search).

The field qualifiers listed below in Table 8 are for individual raw fields that exist in a document. The specified term as entered by the client (with appropriate support for normalization, wildcarding, etc.) must physically occur in the raw field in order for a document to match the query term.

TABLE 8

Raw Fields

| Syntax | Meaning |
| --- | --- |
| an=term | Searches the Accession Number field. |
| du=term | Searches the Original Source field. |
| id=term | Searches the IpdocId field. |
| gc=term | Searches the Group Code field. |
| ngc=term | Searches the Group Name field. |
| ed=term | Searches the Edition field. |
| pg=term | Searches the Page field. |
| vol=term | Searches the Volume field. |
| rve=term | Searches the Revision Editor field. |
| rvn=term | Searches the Revision Number field. |
| lk=term | Searches the Linkage field. |
| se=term | Searches the Section field. |
| clm–term | Searches the Column field. |
| hd=term | Searches the Headline field. |
| by=term | Searches the Byline field. |
| cr=term | Searches the Credit field. |
| cx=term | Searches the Corrections field. |
| lp=term | Searches the Lead Paragraph field. |
| td=term | Searches the Tail Paragraphs field. |
| ct=term | Searches the Contact field. |
| sn=term | Searches the Source Name field. |
| ip=term | Searches the Input Provider field. |
| pub=term | Searches the Publisher field. |
| qid=term | Searches the Intelligent Indexing field. |
| atr=term | Searches the Attribution field. |
| rst=term | Searches the Restrictor field. |
| fmt=term | Searches the Format field. |
| la=term | Searches the Language field. |
| md=term | Searches the Modification Date field. |
| art=term | Searches the Art field. |
| et=term | Searches the Publication Time field. |
| upt=term | Searches the Update Time field. |
| mt=term | Searches the Modification Time field. |
| rf=term | Searches the Notes field. |
| xrf=term | Searches the Cross Reference field. |
| msc=term | Searches the Miscellaneous field. |

The field qualifiers listed below in Table 9 are for umbrella fields, or composite logical fields that comprise multiple raw fields. The specified term as entered (with appropriate support for normalization, wildcarding, etc.) must occur in one (or more) of the corresponding raw fields.

TABLE 9

Umbrella Fields

| Syntax | Meaning | |
| --- | --- | --- |
| hl=term | Searches: | Section Name |
| | | Column Name |
| | | Headline |
| hlp=term | Searches: | Section Name |
| | | Column Name |
| | | Headline |
| | | Corrections |
| | | Lead Paragraph |

The fields listed below in Table 10 are symbology-validated fields. These fields are validated through a symbology server. The symbology lookup convert and/or augment the user's query to properly search the indexed data. For example, the XML document may contain only legacy codes and descriptors in the DE field; however, the de=term query syntax allows the client to search legacy codes and descriptors as well as current codes and descriptors. The Symbology-Validated fields also contain several fields that are "conversion fields". These are fields whose query-syntax field name may not appear as a field name in the XML specification, but the syntax is supported for legacy searching purposes.

TABLE 10

Symbology-Validated Fields

| Syntax | Meaning |
| --- | --- |
| sc=term | Verify the term as a source code, then search. |
| co=term | Verify the term as a company code or descriptor, then search. |
| ns=term | Verify the term as a news subject code or descriptor, then search. |
| re=term | Verify the term as region code or descriptor, then search. |
| in=term | Verify the term as an industry code or descriptor, then search. |
| de=term | Verify the term as a descriptor term, then search. |
| ric=term | Verify the term as a RIC code, then search. |
| isin=term | Verify the term as an ISIN code, then search. |
| cusip=term | Verify the term as a CUSIP code, then search. |
| duns=term | Verify the term as a DUNS term, then search. |
| fds=term | Verify the term as a FDS term, then search. |
| sedol=term | Verify the term as a SEDOL term, then search. |

Range Searching

Range searching is supported for, illustratively, the following document entities: Datestamps (selected) and Document size (word count). Various illustrative syntaxes to be supported for range searching these entities are described below.

Date range searching on article publication dates and update dates is supported via the following syntaxes:

<datefield> from <datespec> to <datespec>
<datefield> before <datespec>
<datefield> after < datespec>
<datefield> <datespec> wherein <datefield> represents one of the following keywords: date (for searching article publication dates) and upd (for searching article update dates); and wherein <datespec> represents a date specification in any format that is supported in the system and can be interpreted unambiguously by the query parser. These formats include: mm/dd/ccyy; dd/mm/ccyy; ccyymmdd; –N; and +N.

The –N and +N syntaxes are shorthand methods for specifying dates that are N days away from the current date. The –N syntax is used for past dates and the +N syntax is used for future dates. For example, a query of:

date from –14 to +7 would find documents whose publication dates are from 14 days ago to 7 days in the future from the current date. A plus or minus sign must be included before N in order for the query parser to interpret the syntax correctly. A value of 0 (for today's date) would have to be specified as –0 or +0. The maximum value for N is 999 days.

The basis of the "current date" in the –N and +N syntaxes is the current GMT date at query execution time, which could result in an undesirable date window if the user's current date differs from the current GMT date (as it does before 12:00 noon in Australia or after 4:00 p.m. in Los Angeles, for example) and the user is unaware of how this processing is performed.

For the mm/dd/ccyy and dd/mm/ccyy date formats, the query parser supports 1- or 2-digit month specifications, 1- or 2-digit day specifications, and 2- or 4-digit year specifications. If a 2-digit year is entered, then it is interpreted as follows: if the year is 60 or greater, it is assumed to be a 1900s date; if the year is 59 or less, it is assumed to be a 2000s date (note that it is expected that the query parser distinguishes between the ambiguous mm/dd/ccyy and dd/mm/ccyy formats via a date format preference stored in the user's profile).

For the ccyymmdd format, the full 8-digit date must be specified.

Date specifications for date range searching cannot contain any reserved wildcard characters ($, *, %, ?).

Illustratively, date specifications are inclusive for the following syntaxes:

<datefield> from <datespec> to <datespec>
<datefield> <datespec>

For example, a user query of:

date from 19990201 to 19990301 finds documents dated between Feb. 1, 1999 and Mar. 1, 1999 including these end dates.

Illustratively, date specifications are exclusive for the following syntaxes:

<datefield> before <datespec>
<datefield> after < datespec>

For example, a user query of:

date after 19990201 finds documents dated Feb. 2, 1999 and later.

Examples of valid date range search syntaxes include the following:

date from 2/1/1999 to 3/1/1999
date before –5
upd after 19990505
upd +0

Note the potential ambiguity in the query language with the date range keywords date and upd. A user could reasonably want to use these terms as normal query terms instead of as date range keywords (for example, as in a user query of "closing date and bids"). To use these either of these keywords as query terms, the term is enclosed in double quotes. See the section below on "Quotes".

Document size range searching allows the client to search for documents of a desired size by using the word count (wc) value in the following syntaxes:

wc>N
wc<N

For these syntaxes, values for N are exclusive. For example, if a user query contains:

wc>500 then the query finds documents containing 501 or more words.

Illustratively, the specification for N in each of these syntaxes must be a numeric (integer) value greater than 0. The specification cannot contain any reserved wildcard characters ($, *, %, ?).

Illustratively, no white space can occur in the syntax.

The wc=N, wc>=N, and wc<=N syntaxes may not be supported in the system.

Document size searching on character count (cc) values may not be supported in the system.

Quotes

Illustratively, double quotes (") are used in the query syntax for two purposes: (1) to enclose query strings that contain query operators (and, or, same, etc.) that should be treated as query terms instead of as query operators; and (2) to enclose query strings that contain either of the date range keywords date or upd to indicate that these should be treated as query terms instead of as date range keywords. Note that single quotes (in any form—apostrophes, grave accents, acute accents) are not concordable characters in the system and are not reserved characters in the query language. As such, they will be treated as white space in user queries.

A variety of other searching features may be supported as desired. These other supportable features include advanced query operators, proxy operators that span fields, precedence rules, and stopwords.

A few examples may be useful for showing how the above query rules and tokenization rules would apply to user queries. In the interpretation line for each example, query operators are displayed in bold. This is to distinguish operators from query terms.

For this example, the user query is: c++ and object-oriented programming. The interpretation is (c adj + adj +) and (object adj oriented adj programming). The analysis is that the plus signs are tokenized as individual characters. Again, the same tokenization rules must be used in source processing in order for this query to hit on the desired documents.

For this example, the user query is: president % clinton. The interpretation is president adj <exactly_one_term> adj clinton. The analysis is that the term 'president' must appear exactly 2 terms from 'clinton'. This means that a document containing 'president bill clinton' matches, but a document containing just 'president clinton' does not. The percent sign wildcard character means that exactly one term must appear in the specified location in the phrase. Note this is a legal usage of the percent sign wildcard character because it is used in a phrase search but it is not the first or last term of the phrase.

For this example, the user query is: bill or william or % or clinton. The interpretation is: Error. The analysis is that the percent sign wildcard character is only legal in phrase searching. In this example, this wildcard character is being used as a standalone query term.

The description of the invention and its applications as set forth herein is illustrative and is not intended to limit the scope of the invention. Variations and modifications of the embodiments disclosed herein are possible, and practical alternatives to and equivalents of the various elements of the embodiments will be apparent to those of ordinary skill in the art from a reading of this detailed description. These and other variations and modifications of the embodiments disclosed herein may be made without departing from the scope and spirit of the invention.

The invention claimed is:

1. A method for computerized processing of document data, comprising:
   receiving the document data;
   retrieving tokenization rules for the document data;
   applying the tokenization rules to the document data to generate a plurality of tokens, each having one or more concordable characters from the document data;
   receiving a user query;
   re-retrieving the tokenization rules;
   applying the re-retrieved tokenization rules to the user query to generate one or more search tokens, each having one or more concordable characters from the user query and wherein the user query is derived from a query language and comprises at least one reserved character from a set of concordable characters for use in the query language; and
   searching an index comprising the tokens with the one or more search tokens.

2. The method of claim 1 further comprising:
   identifying characters and character patterns in textual data expected in the document data; and
   establishing the tokenization rules based upon the identified characters and character patterns;
   wherein the tokens are defined by the identified characters and character patterns.

3. The method of claim 2 further comprising:
   identifying new characters or new character patterns for new conventions in textual data expected in the document data; and
   modifying the tokenization rules based upon the new identified characters and the new character patterns;
   wherein the tokens are defined by the identified characters, the new identified characters, the identified character patterns, and the new identified character patterns.

4. The method of claim 1 wherein the receiving step comprises receiving one or more letters, numbers, punctuation characters, or any combination thereof.

5. The method of claim 1 wherein the tokenization rules comprise pattern definitions and concordable character definitions.

6. The method of claim 5 wherein the concordable character definitions comprise a non-spaceless character set, a punctuation character set, and a spaceless character set.

7. The method of claim 1 further comprising:
   retrieving normalization rules; and
   applying the normalization rules with the tokenization rules to the document data to generate the tokens.

8. The method of claim 1 further comprising:
   retrieving normalization rules;
   applying the normalization rules with the tokenization rules to the document data to generate the tokens;
   re-retrieving the normalization rules; and
   applying the re-retrieved normalization rules with the re-retrieved tokenization rules to the user query to generate the search tokens.

9. A method for computerized query processing comprising:
   receiving a user query;
   retrieving tokenization rules;
   applying the tokenization rules to the user query to generate one or more search tokens, each having one or more concordable characters from the user query wherein the user query is derived from a query language and comprises at least one reserved character from a set of concordable characters for use in the query language; and
   searching an index with the one or more search tokens, the index comprising tokens based on application of the tokenization rules to document data.

10. The method of claim 9 further comprising:
    retrieving normalization rules; and
    applying the normalization rules with the tokenization rules to the user query to generate the search tokens, the tokens in the index further being based on application of the normalization rules to the document data.

11. A method for computerized searching of document data, comprising:
    receiving the document data;
    retrieving tokenization rules for the document data;
    applying the tokenization rules to the document data to generate a plurality of tokens, each having one or more concordable characters from the document data;
    storing the tokens in a data base;
    receiving a user query derived from a query language and comprising at least one reserved character from a set of concordable characters for use in the query language;
    re-retrieving the tokenization rules;
    applying the re-retrieved tokenization rules to the user query to generate one or more search tokens, each having one or more concordable characters from the user query; and
    searching the tokens in the data base with the one or more search tokens.

12. An apparatus comprising a subsystem for computerized processing of search queries, the query processing subsystem comprising:
    a programmed component for receiving a user query;
    a programmed component for retrieving tokenization rules;
    a programmed component for applying the tokenization rules to the user query to generate one or more search tokens, each having one or more concordable characters from the user query wherein the user query is derived from a query language and comprises at least one reserved character from a set of concordable characters for use in the query language; and
    a programmed component for searching an index with the one or more search tokens, the index comprising tokens based on application of the tokenization rules to document data.

13. The apparatus of claim 12 further comprising:
a programmed component for retrieving normalization rules; and
a programmed component for applying the normalization rules with the tokenization rules to the user query to generate the search tokens, the tokens in the index further being based on application of the normalization rules to the document data.

14. An apparatus for computerized searching of document data comprising a source processing subsystem and a query processing subsystem, wherein:
the source processing subsystem comprises:
a programmed component for receiving the document data;
a programmed component for retrieving tokenization rules for the document data; and
a programmed component for applying the tokenization rules to the document data to generate a plurality of tokens for storage in a data base, each of the tokens having one or more concordable characters from the document data; and
the query processing subsystem comprises:
a programmed component for receiving a user query derived from a query language and comprising at least one reserved character from a set of concordable characters for use in the query language;
a programmed component for re-retrieving the tokenization rules; and
a programmed component for applying the re-retrieved tokenization rules to the user query to generate one or more search tokens for searching the tokens in the data base, each of the search tokens having one or more concordable characters from the user query.

15. A computer-readable medium carrying a subsystem program for computerized processing of search queries, the subsystem program executed on a computer comprising:
instructions for receiving a user query;
instructions for retrieving tokenization rules;
instructions for applying the tokenization rules to the user query to generate one or more search tokens, each having one or more concordable characters from the user query wherein the user query is derived from a query language and comprises at least one reserved character from a set of concordable characters for use in the query language; and
instructions for searching an index with the one or more search tokens, the index comprising tokens based on application of the tokenization rules to document data.

16. The computer-readable medium of claim 15 further comprising:
instructions for retrieving normalization rules; and
instructions for applying the normalization rules with the tokenization rules to the user query to generate the search tokens, the tokens in the index further being based on application of the normalization rules to the document data.

17. A computer-readable medium carrying a subsystem program for computerized processing of source documents and a subsystem program for computerized processing of search queries executed on a computer, wherein:
the source processing subsystem program comprises:
instructions for receiving the document data;
instructions for retrieving tokenization rules for the document data; and
instructions for applying the tokenization rules to the document data to generate a plurality of tokens for storage in a data base, each of the tokens having one or more concordable characters from the document data; and
the query processing subsystem program comprises:
instructions for receiving a user query derived from a query language and comprising at least one reserved character from a set of concordable characters for use in the query language;
instructions for re-retrieving the tokenization rules; and
instructions for applying the re-retrieved tokenization rules to the user query to generate one or more search tokens for searching the tokens in the data base, each of the search tokens having one or more concordable characters from the user query.

* * * * *